United States Patent [19]

Ford, Jr. et al.

[11] Patent Number: 5,738,694
[45] Date of Patent: Apr. 14, 1998

[54] PROCESS FOR RECOVERING IRON FROM IRON-CONTAINING MATERIAL

[75] Inventors: George W. Ford, Jr., Salt Lake City; Richard C. Lambert, Highland; Russell G. Madsen, Wellington, all of Utah

[73] Assignee: Covol Technologies, Inc., Lehi, Utah

[21] Appl. No.: 770,605

[22] Filed: Dec. 19, 1996

Related U.S. Application Data

[62] Division of Ser. No. 667,764, Jun. 21, 1996, which is a continuation of Ser. No. 546,975, Oct. 23, 1995, abandoned, which is a continuation-in-part of Ser. No. 468,104, Jun. 6, 1995, Pat. No. 5,589,118, which is a continuation-in-part of Ser. No. 184,099, Jan. 21, 1994, Pat. No. 5,453,103.

[51] Int. Cl.$^6$ ....................................................... C10L 5/00
[52] U.S. Cl. .................................................. 44/553; 524/63
[58] Field of Search ........................................ 524/705, 785, 524/63, 440; 526/103, 191, 341; 44/553

[56] References Cited

U.S. PATENT DOCUMENTS

| | | | |
|---|---|---|---|
| 136,466 | 3/1873 | Stewart . | |
| 1,966,553 | 7/1934 | Kropp | 44/553 |
| 2,898,076 | 2/1959 | Nanke | 264/122 |
| 3,362,800 | 1/1968 | Belak et al. | 44/553 |
| 3,836,343 | 9/1974 | Romey et al. | 44/553 |
| 3,898,076 | 8/1975 | Ranke | 264/122 |
| 4,313,958 | 2/1982 | LaHann . | |
| 4,314,932 | 2/1982 | Wakimoto et al. | 524/785 |
| 4,314,982 | 2/1982 | Wakimoto et al. | 524/775 |
| 4,415,337 | 11/1983 | Kutta et al. | 44/553 |
| 4,417,899 | 11/1983 | Morris et al. | 44/553 |
| 4,586,936 | 5/1986 | Schaffer et al. | 44/10 |
| 4,592,912 | 6/1986 | Nickolaus . | |
| 4,708,863 | 11/1987 | Bews et al. . | |
| 4,802,914 | 2/1989 | Rosen et al. | 75/3 |
| 4,863,485 | 9/1989 | Schaffer et al. | 44/16 |
| 5,098,694 | 3/1992 | Komp et al. . | |
| 5,147,452 | 9/1992 | Anderson et al. | 75/67 |
| 5,169,631 | 12/1992 | Rase et al. . | |
| 5,178,879 | 1/1993 | Adekunle et al. . | |
| 5,244,473 | 9/1993 | Sardessai et al. | 44/553 |
| 5,453,103 | 9/1995 | Ford et al. | 44/533 |
| 5,589,118 | 12/1996 | Ford et al. | 264/122 |

*Primary Examiner*—Veronica P. Hoke
*Attorney, Agent, or Firm*—Foster & Foster

[57] ABSTRACT

Iron-rich material waste products, such as electric arc furnace dust, are formed with an organic binder into discrete shapes, such as briquettes and/or other solid shapes. The shapes can then be used in iron and steel making processes and the iron and heavy metal values in the waste product recovered.

13 Claims, 1 Drawing Sheet

PROCESS FOR RECOVERING IRON FROM IRON-CONTAINING MATERIAL

CONTINUITY

This application is a division of co-pending U.S. patent application Ser. No. 08/667,764, filed Jun. 21, 1996 pending, which is a continuation of U.S. patent application Ser. No. 08/546,975, filed Oct. 23, 1995, now abandoned, without prejudice, which is a continuation-in-part of U.S. patent application Ser. No. 08/468,104, filed Jun. 6, 1995, now U.S. Pat. No. 5,589,118, which is a continuation-in-part of U.S. patent application Ser. No. 08/184,099, filed Jan. 21, 1994, now U.S. Pat. No. 5,453,103.

FIELD OF THE INVENTION

The present invention involves the recovery of metal values from metallurgical waste materials, particularly those wastes formed in iron and steel making processes.

BACKGROUND

In the production processes of iron and steel, waste materials are formed that contain oxidized iron and frequently other oxidized metals. These are usually materials in the form of dust in the gas waste streams. This waste is difficult to process because the dust usually has a fine particle size, and merely reintroducing it into a reduction furnace to recover the iron will usually result in it becoming again a part of the waste gas stream. Accordingly, these fine particle size materials, even though they contain a substantial metal content, have been essentially worthless.

There are methods of storing and stabilizing the dust into piles near the steel-making facility, but this option is becoming increasingly unacceptable as environmental regulations become stricter and as available space becomes more restrictive because land values increase. The dust can also be recycled and stabilized into ceramic or building materials but not necessarily on a cost effective basis. But these methods do not exploit the value of the residual iron and other metals in the waste.

A waste material of common concern is dust from electric arc furnaces, commonly referred to as EAF dust. Electric arc furnaces typically melt scrap metal through the use of high voltage electrical current. The scrap metal may come from a variety of sources, including; discarded railroad rails, cut sheet steel, discarded structural steel, and scrap automobiles. The scrap metal is added to the electric arc furnaces without separating non-ferrous metals, such as lead, zinc, and cadmium. During the operation of the electric arc furnace, these non-ferrous metals are vaporized from the scrap, condensed into a dust from the waste gas stream and are deposited in a bag house. In addition to these metals, the waste gas stream deposits a large amount of recoverable iron in the bag house. Accordingly, the iron and heavy metal, usually in an oxidized form, are combined in an amorphous EAF dust with particle sizes commonly less than 20 microns. Such EAF dust is now classified as hazardous waste by the EPA due to the lead and cadmium content. As such, extensive procedures must be maintained in order to protect the environment from heavy metal contamination and meet EPA regulations. All the metals in the EAF dust have value and can be reclaimed if an efficient way of separation and reduction of the component dust can be achieved. Additionally, the EAF dust can be rendered non-toxic, if the trace heavy metals can be removed from the dust.

Several processes have been applied to this problem with differing degrees of success. While these processes have been successful in removing heavy metals, they have been inadequate in recovering the iron, and generally leave a fine iron oxide-containing dust of no value.

The most common approach is called fuming. This process utilizes the differing boiling points of the heavy metals to obtain their separation. The dust is heated to temperatures above the boiling points of the metals being separated, causing the metals to evaporate. The evaporated metals are removed as a dust from the gas and condensed in a collection device for further processing. The boiling points of these trace metals are considerably lower than that of iron, which is the largest single component of the dust. After the lead, zinc, and cadmium are separated, the remaining dust consists primarily of iron in the form of iron oxide. Being in a dust form, this material cannot be successfully processed into iron and is left as a waste. Another problem with fuming, is that it is energy intensive, and it also produces a significant amount of its own waste dust.

Another process used to treat EAF dust is electrowinning. This process combines a leaching and precipitation operation with electrolytic deposition. The EAF dust is first dissolved in an electrolyte to solubilize the lead, zinc, and cadmium. The solution is filtered and then precipitated with a zinc powder to capture the lead and cadmium. The resulting zinc solution is then passed through an electrochemical recovery cell to recover the zinc. This process recovers zinc quite well, but the leaching process does not dissolve the iron oxides and zinc ferrite, which remain as waste materials that must be dried. The dried material, once again, is in the form of a fine dust with little or no value.

EAF dust has also been processed by blending with silicate materials, such as silica sand, clay, or cullet, and heated in a furnace to form a vitrified ceramic product. The ceramic is useful as an abrasive, and the EAF dust is rendered nonhazardous, but the valuable metals contained in the dust are not recovered. These metals have been processed through an expensive refining technique just to be converted into a relatively low value material in order to render them nonhazardous.

OBJECTS OF THE INVENTION

It is, therefore, an object of the invention to provide a method for the treatment of dusts containing iron and heavy metals that recovers both the iron and the heavy metals as a usable product.

Further objects of the invention will become evident in the description below.

SUMMARY OF THE INVENTION

In brief summary, the present invention overcomes or substantially alleviates the above-identified problems of the prior art. A method for forming a solid product, in the form of briquettes, pellets, and/or as other solid objects, is provided. The resulting product comprises an iron-containing, iron-bearing, or iron-rich material, e.g. EAF dust, and a carbon source, e.g., coke breeze, coal fines, and/or revert materials, bound together into solid shapes or articles, such as briquettes, to substantially prevent degradation into dust and smaller pieces. The briquettes provide a source of iron in steel and iron-making processes and carbon for reduction of the iron. Furthermore, heavy metals in the iron-containing material are also incorporated into the briquettes and during the iron-reduction process are separated by being vaporized or fumed, thereby allowing these to be recovered. This fuming method is unique in that the feed material is first formed into a stable solid through the use of briquetting or extruding a convenient shape or a like technique, utilizing the reaction product of particulate carbon and an organic binder. The binder reaction product maintains the formed dust materials until the zinc, lead, and cadmium have evaporated, and the iron oxides have been reduced to elemental iron. This method allows all the materials contained in the EAF dust to be reclaimed in one process. The fuel for this process can be either waste coke breeze, waste coal fines, electric arc, or natural gas, depending on which provides cost advantage.

Accordingly, the present process is for recovering iron and heavy metals from powdered or particulate iron-bearing, iron-containing, and/or iron-rich materials. These powders, from which it has been previously not possible to recover the iron values, can now be manufactured into shapes or articles that can be utilized in iron and steel manufacture. Not only is the iron recovered, but also any heavy metals are also recovered. Prior attempts to place carbon-containing materials, such as coke breeze, coal fines, and/or revert materials in a solid form, such as briquettes, has been largely unsuccessful because the product does not adequately bind and is unstable, disintegrating or retrogressively degrading back into small, fine particles during storage and handling prior to use. However, the present invention allows a carbon and iron containing material to be formed into a solid shape that is strong and durable enough for handling and storage, as well as sufficient to bind the shapes in an iron-reduction process to inhibit early disintegration of the shape such that they are carried into the waste gasses as dust.

An embodiment of the invention is a process for manufacturing shapes from fine iron-containing or iron-rich material, the process may comprise;

(a) mixing the iron-containing material, and a carbon source, to form a iron-containing/carbon mixture, the powdered material being essentially free of oils and moisture;

(b) dissolving styrene or acrylonitrile polymer resin in a hygroscopic solvent to form a dissolved resin or conditioner;

(c) combining the dissolved resin, the iron-containing/carbon mixture, calcium carbonate, and an alumino-silicate binder;

(d) emulsifying polyvinyl homopolymer in water, adding the emulsion to the combination of step (c) and substantially homogenizing the resultant; and (e) compressing the resultant from (d) into shapes.

By "fine iron-containing materials" is meant any powdered or small particle or particulate material containing iron, iron oxides and/or other iron compounds. The material may also contain other metals, including heavy metals, in any form such as in metal oxides, as well as other minerals, particularly those found in ores, waste materials from mineral extraction, and the like.

A suitable iron-containing material is electric arc furnace dust (EAF dust) that is deposited from waste gas streams coming from electric arc furnaces used in iron and steel production. Other suitable iron-containing materials include other by-products from steel production, such as mill scale, precipitated iron oxide, and dust (so-called sludge), typically collected in the filter bag houses of oxygen furnaces.

The iron-containing material is normally essentially free of moisture, i.e. , with a moisture level at or below 2 wt. %, and is essentially free of non-mineral substances, such as oils. This can be accomplished by any suitable cleaning and drying method, preferably, by the method that is more fully described and illustrated in the examples.

The particulate material is first mixed with a carbon source. At this point, the iron-containing material and the carbon source material may be optionally reacted with a mineral acid, such as hydrochloric acid. The carbon source may be any suitable source, such as a metallurgical grade coke. The carbon source should be fine enough and in a form that allows formation of the solid shapes, as discussed further below. In addition, it should not contain impurities that would interfere materially with formation of the shape or with the subsequent iron-reduction process in which the shape is used. The carbon source is typically a fine powdered material.

In a typical application of the invention, the powdered or particulate material and the carbon source are mixed to form a mixture of about 15 to 35 wt. %, preferably about 25 wt. % of the carbon source. The mixture is then reacted with hydrochloric acid. The mixture is preferably reacted with hydrochloric acid, in an mount between about 1 and 4 wt. %, preferably about 2 wt. % acid.

After reaction with hydrochloric acid, the iron-containing/carbon mixture is then compounded into a mixture with binders for forming into one or more shapes. The reacted mixture is mixed with calcium carbonate, an alumino-silicate binder, an organic binder, and a polyvinyl alcohol. That may be accomplished by mixing the reacted mixture with calcium carbonate and an alumino-silicate material. The calcium carbonate acts as a hardener and also as a flux for removal of impurities during the reduction to iron phase. The alumino-silicate also functions as a hardener for the shapes, and also as a flux. The alumino-silicate material may be any of such materials used in forming shapes, such as kaolin clay materials, kaolinite, mixtures of alumina and silica, dolomite lime type clays, and the like.

An organic binder is mixed into the mixture with the calcium carbonate and alumino-silicate. The binder is the binder described in U.S. Pat. No. 5,453,103, which disclosure is hereby incorporated by reference. This binder is made by dissolving styrene or acrylonitrile polymer resin in a hygroscopic solvent, such as methyl-ethyl-ketone.

An emulsion made by emulsifying a polyvinyl polymer in water is added to the mixture with the styrene polymer binder. The resultant is then substantially homogenized. The polyvinyl polymer may be polyvinyl alcohol or polyvinyl acetate.

The homogenized mixture with the polyvinyl acetate or polyvinyl alcohol is then formed into solid shapes by any suitable method, such as extrusion, molding, and/or compression. Typically, the extrusion or molding pressures are high, between about 15,000 and 45,000 psi, preferably about 30,000 psi, to produce dense, and fracture and abrasion resistant product.

DETAILED DESCRIPTION OF THE DISCLOSED EMBODIMENTS

Example I

Figure 1:
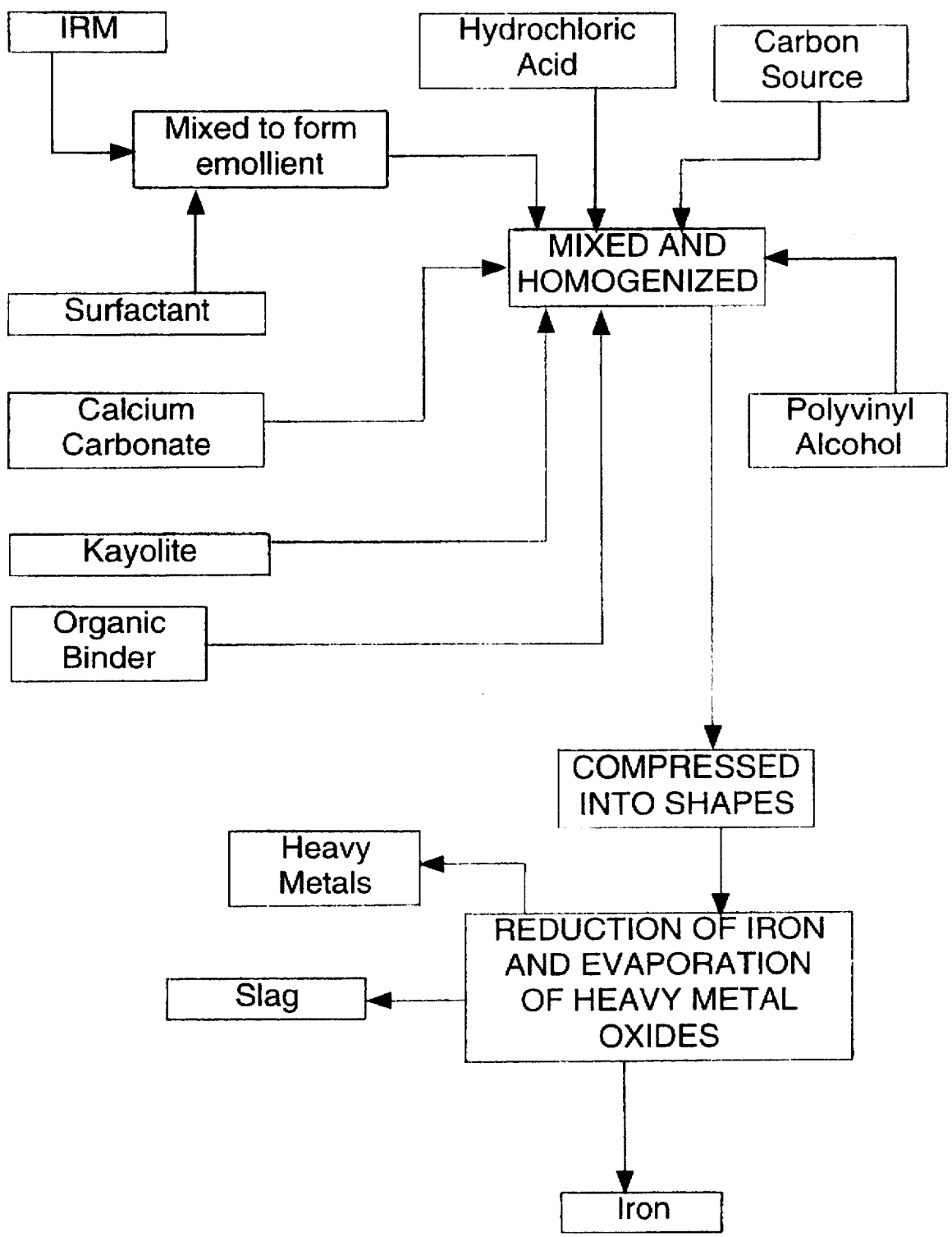
FIG. 1 is a flow sheet illustrating an embodiment of the invention.

This example illustrates the treatment of powdered iron-containing material (IRM) feedstocks and culminates in the production of high-grade iron metal. Referring to FIG. 1, IRM is first cleaned using a surfactant to create an emollient containing the oils and other contaminants found in the IRM. The IRM is dried in a rotary kiln to vaporize the emollient and reduce the total moisture content, preferably to below about 2 wt. %, although up to 6 wt. % may be used, depending upon the composition being processed.

The cleaned IRM is then weighted into a mixer along with approximately 25 wt. % metallurgical grade coke and reacted with hydrochloric acid at about 2 wt. %. The IRM, coke and hydrochloric acid is then mixed for about 5 minutes.

After mixing, about 5 wt. % calcium carbonate and 2.5 wt. % Kayolite ($Al_2O_3+SIO_2$) are added to the acid treated IRM and coke and mixed for about 5 minutes. The calcium carbonate and Kayolite act as hardeners in the IRM mixture and also as fluxes as the material is reduced to metal.

After mixing, about 3 wt. % of an organic binder material is added to the batch mixer and allowed to mix for approximately 5 minutes. The binder is a styrene polymer resin (10 wt. %) dissolved in a hygroscopic solvent, such as methyl-ethyl-ketone. As this binder contains a hygroscopic solvent, any water generated in the earlier reactions is driven off with the solvent.

After mixing, about 4 wt. % of a polyvinyl alcohol homopolymer is added to the mixture and allowed to mix for 10 minutes. The material is then fed into a briquetting press under high injection pressure or like machine to form an easily handled, hard shape.

The formed briquettes or other solid shapes are then heated to about 250° F. to 400° F. to cure. The curing process reduces the moisture content of the briquette to less than about 2 wt. %. Once cured, the briquettes are introduced into an electric arc furnace where reduction of the oxides takes place. Reduction of iron oxides can take place with minimal power penalty due to the fact that the briquette continues to be held together under the slag layer by the binder until such time as the reduction reaction takes place between the coke and oxidized iron. The other materials added to the briquette or other solid shape act as fluxes carrying impurities into the slag layer above the liquid metal bath.

Instead of the styrene polymer, an acrylonitrile polymer may be used. A suitable homopolymer material is 32-024 homopolymer PVA emulsion, available from National Starch and Adhesive. The acrylonitrile polymer is preferably retained in a prolonged fluid state by methyl-ethyl-ketone. Acrylonitrile polymer is available from Polymerland. Technical grade methyl-ethyl-ketone, available from Dice Chemical Co. and Thatcher Chemical Co., is satisfactory. Ninety percent (90%) by weight methyl-ethyl-ketone and ten percent (10%) by weight acrylonitrile polymer is suitable, although these amounts can be varied.

Examples II to V

These examples illustrate the treatment of powdered iron-rich material (IRM) feedstocks and culminates in the production of high-grade iron metal. The general procedure for each of the examples was first to clean the IRM using a surfactant to create an emollient containing the oils and other contaminants found in the IRM. The IRM is dried in a rotary kiln to vaporize the emollient and reduce the total moisture content.

The cleaned IRM is then weighted into a mixer along with the particulate carbon source reacted with hydrochloric acid at about 2 wt. %. The IRM, particulate carbon source and hydrochloric acid are then mixed for about 5 minutes.

After mixing, about 5 wt. % calcium carbonate and an alumino-silicate, 2.5 wt. % Kayolite ($Al_2O_3+SIO_2$), are added to the acid treated IRM and particulate carbon and mixed for about 5 minutes.

After mixing, about 3 wt. % of an organic binder material is added to the batch mixer and allowed to mix for approximately 5 minutes. The binder was an acrylonitrile polymer and was retained in a prolonged fluid state by methyl-ethyl-ketone as described above.

After mixing, about 4 wt. % of a polyvinyl alcohol homopolymer, such as used in Example I, is added to the mixture and allowed to mix for 10 minutes. The material is then fed into a briquetting press under high injection pressure or using other machinery to form an easily handled, hard, solid shape.

The formed briquettes or other solid shapes are then heated to about 250° F. to 400° F. to cure. The curing process reduces the moisture content of the briquette to less than about 2 wt. %. Once cured, samples of the briquettes or other solid shapes were introduced into an electric arc furnace where reduction of the oxides takes place. Analyses of the starting materials, and the iron and slag products resulting from the reduction were made. The results of the tests are summarized below.

Example II

For this Example, the particulate carbon was coke breeze (10400 BTU), and the IRM was a mixture of mill scale from a steel mill (Nucor, Plymoth, Utah), and an iron oxide precipitate from a oxygen furnace (Gulf States, Gadston, Ala.). The analysis of the starting materials, the briquette produced, and the reduction products (in wt. %) are shown below in Table A. Of the mass of the briquette introduced into the reduction process, approximately 88% went into the iron product, and 21% into the slag (These numbers do not add exactly to 100% because of inaccuracies in measurement and round-off errors.)

TABLE A

BASIC IRON TESTS

| | STARTING MATERIALS FOR FORMING BRIQUETTE | | | | REDUCTION PRODUCTS | |
| --- | --- | --- | --- | --- | --- | --- |
| | COKE | NUCOR MILL | GULF STATES | | | |
| DESCRIPTION SAMPLE NO. | BREEZE 1/8-15-1 | SCALE 2/8-15-1 | PRECIP 3/8-15-1 | BRIQ 4/8-15-1 | IRON 5/8-15-1 | SLAG 6/8-15-1 |
| CARBON | 63.3 | 0.41 | 6.59 | 18.2 | 3.27 | 0.82 |
| SULFUR | 0.54 | 0.03 | 0.12 | 0.22 | 0.12 | 0.46 |
| IRON | | 73.4 | 51.1 | 45.5 | 83.6 | 6.88 |
| MANGANESE | | 0.54 | 0.26 | 0.316 | 0.131 | 0.843 |

TABLE A-continued

BASIC IRON TESTS

| | STARTING MATERIALS FOR FORMING BRIQUETTE | | | | REDUCTION PRODUCTS | |
|---|---|---|---|---|---|---|
| | COKE | NUCOR MILL | GULF STATES | | | |
| DESCRIPTION SAMPLE NO. | BREEZE 1/8-15-1 | SCALE 2/8-15-1 | PRECIP 3/8-15-1 | BRIQ 4/8-15-1 | IRON 5/8-15-1 | SLAG 6/8-15-1 |
| PHOSPHORUS | | 0.01 | 0.01 | 0.01 | 0.005 | 0.018 |
| SILICON | | 0.32 | 0.84 | 1.15 | 0.35 | 12 |
| COPPER | | 0.206 | 0.061 | 0.088 | 0.194 | 0.028 |
| NICKEL | | 0.063 | 0.029 | 0.032 | 0.101 | 0.01 |
| CHROME | | 0.063 | 0.03 | 0.046 | 0.094 | 0.039 |
| MOLY | | 0.005 | 0.015 | 0.005 | 0.004 | 0.003 |
| TIN | | 0.026 | 0.07 | 0.017 | 0.03 | 0.001 |
| ZINC | | 0.008 | 0.426 | 0.143 | 0.008 | 0.001 |
| BORON | | 0.01 | 0.01 | 0.01 | 0.03 | 0.01 |
| TITANIUM | | 0.002 | 0.022 | 0.025 | 0.002 | 0.167 |
| ARSENIC | | 0.001 | 0.001 | 0.001 | 0.001 | 0.001 |

Example III

For this Example, the particulate carbon was coke breeze (10400 BTU), and the IRM was a mixture of mill scale from a steel mill, and sludge from the filters from a basic oxygen furnace (Q-BOP) (both at Geneva, Utah). The analysis of the starting materials, the briquette produced, and the analyses of the reduction products of five reduction tests of the briquettes (in wt. %), are shown below in Tables B-1 and B-2. For tests 1 to 3 the results are for the slag accumulated over all three tests. The percent of the mass from the briquettes introduced into the reduction process that resulted in the iron product and the slag are shown in Table C. (These numbers do not add exactly to 100% because of inaccuracies in measurement and round-off errors.)

TABLE B-1

BASIC IRON TESTS

| | STARTING MATERIALS FOR FORMING BRIQUETTE | | | REDUCTION PRODUCTS | | | |
|---|---|---|---|---|---|---|---|
| DESCRIPTION SAMPLE/TEST# | GENEVA MILL SCALE 11/8-16-2 | GENEVA SLUDGE 12/8-16-2 | BRIQ 13/8-16-2 | TEST 1 IRON 14/8-16-2 | TEST 2 IRON 15/8-16-3 | TEST 3 IRON 16/8-17-4 | TEST 1-3 SLAG 17/8-17-4 |
| CARBON | 2.28 | 19.4 | 7.35 | 1.85 | 2.21 | 1.61 | 0.15 |
| SULFUR | 0.07 | 0.28 | 0.09 | 0.08 | 0.06 | 0.07 | 0.28 |
| IRON | 69.3 | 41.5 | 57.5 | 93.2 | 96 | 97 | 1.22 |
| MANGANESE | 0.596 | 0.083 | 0.475 | 0.3 | 0.024 | 0.081 | 0.94 |
| PHOSPHORUS | 0.01 | 0.084 | 0.007 | 0.007 | 0.008 | 0.005 | 0.011 |
| SILICON | 0.01 | 0.014 | 8 | 0.06 | 0.01 | 0.21 | 0.01 |
| COPPER | 0.087 | 0.01 | 0.007 | 0.063 | 0.009 | 0.031 | 0.003 |
| NICKEL | 0.032 | 0.001 | 0.008 | 0.069 | 0.011 | 0.022 | 0.003 |
| CHROME | 0.042 | 0.01 | 0.01 | 0.89 | 0.021 | 0.0119 | 0.002 |
| MOLY | 0.003 | 0.01 | 0.01 | 0.014 | 0.012 | 0.157 | 0.01 |
| TIN | 0.003 | 0.034 | 0.007 | 0.004 | 0.001 | 0.001 | 0.29 |
| ZINC | 0.015 | 0.35 | 0.036 | 0.013 | 0.005 | 0.007 | 0.005 |
| BORON | 0.01 | 0.25 | 0.26 | 0.01 | 0.01 | 0.01 | 1.45 |
| TITANIUM | 0.003 | 0.034 | 0.007 | 0.004 | 0.001 | 0.001 | 0.29 |
| ARSENIC | 0.003 | 0.003 | 0.003 | 0.03 | 0.003 | 0.003 | 0.003 |
| ALUMINUM | | | | | | | 18.4 |
| MAGNESIUM | | | | | | | 6.64 |
| LEAD | | | | | | | 3.77 |
| CADMIUM | | | | | | | 0.01 |

TABLE B-2

BASIC IRON TESTS

| DESCRIPTION SAMPLE/TEST# | STARTING MATERIALS FOR FORMING BRIQUETTE | | | REDUCTION PRODUCTS | | | |
|---|---|---|---|---|---|---|---|
| | GENEVA MILL SCALE 11/8-16-2 | GENEVA SLUDGE 12/8-16-2 | BRIQ 13/8-16-2 | TEST 4 IRON 18/8-17-5 | TEST 4 IRON 19/8-17-5 | TEST 5 IRON 20/8-21-6 | TEST 5 SLAG 21/8-21-6 |
| CARBON | 2.28 | 19.4 | 7.35 | 2.34 | 0.16 | 2.39 | 0.26 |
| SULFUR | 0.07 | 0.28 | 0.09 | 0.06 | 0.37 | 0.07 | 0.33 |
| IRON | 69.3 | 41.5 | 57.5 | 86.1 | 1.5 | 89.6 | 0.75 |
| MANGANESE | 0.596 | 0.083 | 0.475 | 0.446 | 1.2 | 0.175 | 0.678 |
| PHOSPHORUS | 0.01 | 0.084 | 0.007 | 0.09 | 0.017 | 0.01 | 0.003 |
| SILICON | 0.01 | 0.014 | 8 | 0.05 | 0.01 | 0.193 | 23.5 |
| COPPER | 0.087 | 0.01 | 0.007 | 0.04 | 0.002 | 0.036 | 0.014 |
| NICKEL | 0.032 | 0.001 | 0.008 | 0.043 | 0.003 | 0.027 | 0.001 |
| CHROME | 0.042 | 0.01 | 0.01 | 0.064 | 0.01 | 0.029 | 0.001 |
| MOLY | 0.003 | 0.01 | 0.01 | 0.003 | 0.003 | 0.01 | 0.01 |
| TIN | 0.003 | 0.034 | 0.007 | 0.058 | 0.251 | 0.03 | 0.01 |
| ZINC | 0.015 | 0.35 | 0.036 | 0.014 | 0.002 | 0.006 | 0.005 |
| BORON | 0.01 | 0.25 | 0.26 | 0.01 | 1.56 | 0.01 | 1.53 |
| TITANIUM | 0.003 | 0.034 | 0.007 | 0.058 | 0.251 | 0.046 | 0.357 |
| ARSENIC | 0.003 | 0.003 | 0.003 | 0.003 | 0.003 | 0.005 | 0.0058 |

TABLE C

REDUCTION PRODUCTS

| REDUCTION TEST | IRON | SLAG |
|---|---|---|
| 1 | 96.594 | 4.667 |
| 2 | 98.385 | |
| 3 | 99.2199 | |
| 4 | 89.379 | 5.342 |
| 5 | 92.637 | 27.4548 |

Example IV

For this Example, the particulate carbon was coke breeze (10400 BTU), and the IRM was a mixture of iron ore from the Geneva mine near Cedar City, Utah, and sludge from the filters from a basic oxygen furnace (Q-BOP) (Geneva Steel, Geneva, Utah). The analysis of the starting materials, the briquette produced, and the analyses of the reduction products of five reduction tests of the briquettes (in wt. %), are shown below in Table D. Of the mass from the briquettes introduced into the reduction process about 88.9% ended up in the iron product and 22.1% ended up in the slag product for Test 1. (These numbers do not add to 100% exactly because of inaccuracies in measurement and round-off errors.) This data was not obtained for Test 2.

TABLE D

BASIC IRON TESTS

| DESCRIPTION SAMPLE# | STARTING MATERIALS FOR FORMING BRIQUETTE | | | REDUCTION PRODUCTS | | | |
|---|---|---|---|---|---|---|---|
| | RED SEA SLUDGE 24/8-21-8 | CEDAR ORE 25/8-21-8 | BRIQ 26/8-21-8 | TEST 1 IRON 22/8-21-7 | TEST 1 SLAG 23/8-21-7 | TEST 2 IRON 27/8-21-8 | TEST 2 SLAG 28/8-21-8 |
| CARBON | 0.82 | 0.24 | 21.6 | 2.29 | 0.86 | 2.69 | 10.7 |
| SULFUR | 0.1 | 0.06 | 0.19 | 0.05 | 0.47 | 0.01 | 1.5 |
| IRON | 46.1 | 46.4 | 33.9 | 86 | 2.25 | 40.5 | 2.93 |
| MANGANESE | 0.319 | 0.058 | 0.113 | 0.2 | 0.897 | 0.084 | 0.013 |
| PHOSPHORUS | 0.012 | 0.06 | 0.033 | 0.008 | 0.013 | 0.03 | 0.01 |
| SILICON | 1.96 | 3.11 | 6.5 | 0.229 | 15.7 | 0.515 | 3.6 |
| COPPER | 0.052 | 0.001 | 0.015 | 0.024 | 0.002 | 0.017 | 0.006 |
| NICKEL | 0.011 | 0.028 | 0.014 | 0.025 | 0.001 | 0.025 | 0.004 |
| CHROME | 0.03 | 0.006 | 0.001 | 0.033 | 0.01 | 0.03 | 0.005 |
| MOLY | 0.01 | 0.01 | 0.01 | 0.01 | 0.01 | 0.01 | 0.01 |
| TIN | 0.02 | 0.02 | 0.01 | 0.03 | 0.01 | 0.01 | 0.01 |
| ZINC | 0.386 | 0.012 | 0.142 | 0.006 | 0.005 | 0.005 | 0.005 |
| BORON | 0.01 | 0.01 | 0.01 | 0.01 | 1.67 | 0.05 | 0.06 |
| TITANIUM | 0.02 | 0.005 | 0.018 | 0.033 | 0.228 | 0.046 | 0.021 |
| ARSENIC | 0.005 | 0.005 | 0.005 | 0.005 | 0.005 | 0.005 | 0.005 |

Example V

For this Example, the particulate carbon was coke breeze (10400 BTU), and the IRM was ferric oxide dust derived as a byproduct form photographic film production. The analysis of different batches starting materials, and a cumulative analysis of the iron reduction products (in wt. %), are shown below in Table E.

TABLE E

BASIC IRON TESTS

STARTING IRON MATERIALS FOR FORMING BRIQUETTE

| DESCRIPTION TEST# | KMFE203 DUST 29.00 | KMFE203 DUST 30.00 | KMFE203 DUST 29.00 | KMFE203 DUST 30.00 | IRON PRODUCT KMFE203 31.00 |
|---|---|---|---|---|---|
| CARBON | 0.030 | 0.030 | 0.030 | 0.030 | 3.020 |
| SULFUR | 0.020 | 0.025 | 0.020 | 0.025 | 0.022 |
| IRON | 60.500 | 63.600 | 60.500 | 63.600 | 88.200 |
| MANGANESE | 2.270 | 2.280 | 2.270 | 2.280 | 0.200 |
| PHOSPHORUS | 0.003 | 0.003 | 0.003 | 0.003 | 0.032 |
| SILICON | 0.570 | 0.610 | 0.570 | 0.610 | 0.330 |
| COPPER | 0.001 | 0.001 | 0.001 | 0.001 | 0.514 |
| NICKEL | 0.007 | 0.006 | 0.007 | 0.006 | 0.114 |
| CHROME | 0.048 | 0.047 | 0.048 | 0.047 | 0.275 |
| MOLYBDENUM | 0.010 | 0.010 | 0.010 | 0.010 | 0.090 |
| TIN | 0.010 | 0.020 | 0.010 | 0.020 | 0.030 |
| ZINC | 0.067 | 0.068 | 0.067 | 0.068 | 0.013 |
| TITANIUM | 0.027 | 0.030 | 0.027 | 0.030 | 0.015 |

Example VI

For this Example, the particulate carbon were coal fines, and the IRM was the same as in Example III. The analysis of the iron and slag reduction products (in wt. %), are shown below in Table F.

TABLE F

BASIC IRON TESTS

| DESCRIPTION SAMPLE/TEST # | SLAG PRODUCT FROM COAL 33/9-21-37 | IRON PRODUCT FROM COAL 34/9-21-37 |
|---|---|---|
| CARBON | 3.29 | 2.74 |
| SULFUR | 0.02 | 1.05 |
| IRON | 14.03 | 89.10 |
| MANGANESE | 0.22 | 0.55 |
| PHOSPHORUS | 0.02 | 0.01 |
| SILICON | 7.38 | 1.65 |
| COPPER | 0.00 | 0.45 |
| NICKEL | 0.01 | 0.06 |
| CHROME | 0.03 | 0.12 |
| MOLYBDENUM | 0.01 | 0.01 |
| TIN | 0.01 | 0.04 |
| ZINC | 0.01 | 0.01 |
| TITANIUM | 0.07 | 0.05 |

Theory

It is believed that the present invention polymerizes the carbon particles contained in the carbon source into a new long chain polymer compound, yet unidentified, which provides structurally superior strength of the shapes. It is known that oxides of carbon will hydrolyze in water. This reaction leaves free carboxyl ions present in the compound.

Introduction of the doped methyl-ethyl-ketone is believed to allow for attachment of the styrene polymer to the free carbon ions by exchange of the polymer for water which is absorbed into the solvent.

In the next phase, polyvinyl acetate is introduced. Again the presence of the methyl-ethyl-ketone acts as a catalyst to remove and allow the acrylonitrile or styrene to react to the polyvinyl acetate.

The resulting compressed shapes, such as briquettes, pellets, and/or extruded solid pieces are structurally stable and do not retrogress into fine particles during storage and handling.

While this invention has been described with reference to certain specific embodiments and examples, it will be recognized by those skilled in the art that many variations are possible without departing from the scope and spirit of this invention, and that the invention, as described by the claims, is intended to cover all changes and modifications of the invention which do not depart from the spirit of the invention.

What is claimed and desired to be secured by Letters Patent is:

1. An article comprising fine iron-containing material and carbon formed by:

mixing the iron-containing material, and the carbon, to form an iron containing/carbon mixture, the mixture being essentially free of oils and moisture; dissolving styrene or acrylonitrile polymer in a hygroscopic solvent; combining the dissolved styrene or acrylonitrile polymer, the iron-containing/carbon mixture, calcium carbonate, and an alumino-silicate binder; emulsifying polyvinyl polymer in water, adding the emulsion to the combination and substantially homogenizing the resultant; and compressing the resultant into the articles.

2. The article of claim 1 wherein the polyvinyl polymer is polyvinyl alcohol.

3. The article of claim 1 wherein the polyvinyl polymer is polyvinyl acetate.

4. The article of claim 1 wherein hydrochloric acid is added during the mixing of the iron-containing mixture and carbon.

5. The article of claim 1 wherein the resultant in (e) is compressed into shape articles in a briquetting press.

6. The article of claim 1 wherein the resultant in (e) is compressed into articles through extrusion.

7. The article of claim 1 additionally comprising the step of heating the articles to remove moisture from the articles.

8. The article of claim 1 wherein the articles are available for introduction into a reaction environment for reduction of the iron in the articles.

9. The article of claim 1 wherein the iron-containing material contains heavy metals and the articles are available for introduction into a furnace for evaporation of the heavy metals and for reduction of the iron.

10. The article of claim 1 wherein the iron-containing material is treated before the first step by mixing the iron-containing material with a surfactant to disengage non-mineral substances and form an emollient substance comprising surfactant and the non-minerals, and drying the emollient substance to reduce the moisture content thereof by vaporization.

11. The article according to claim 1 wherein the articles are compressed at a pressure of about 30,000 psi.

12. The article according to claim 1 wherein the hygroscopic solvent comprises methyl ethyl ketone.

13. An article comprising fine iron-containing material and carbon formed by:

mixing the iron-bearing material, and carbon, to form an iron-bearing/carbon mixture, the mixture being essentially free of oils and moisture; dissolving acrylonitrile polymer in a hygroscopic solvent; combining the dissolved acrylonitrile resin, the iron-bearing/carbon mixture, calcium carbonate, and an alumino-silicate binder; emulsifying polyvinyl polymer in water, adding the emulsion to the combination and substantially homogenizing the resultant; and compressing the resultant into shape articles.

* * * * *